(12) United States Patent
Margolis et al.

(10) Patent No.: US 8,380,872 B2
(45) Date of Patent: Feb. 19, 2013

(54) PEER-TO-PEER TELEPHONY RECORDING

(75) Inventors: Stas Margolis, Alfei Menashe (IL);
Leon Portman, Rishon Lezion (IL);
Mordehai Cory, Raanana (IL)

(73) Assignee: Nice Systems Ltd., Raanana (IL)

( * ) Notice: Subject to any disclaimer, the term of this patent is extended or adjusted under 35 U.S.C. 154(b) by 494 days.

(21) Appl. No.: 12/651,051

(22) Filed: Dec. 31, 2009

(65) Prior Publication Data

US 2011/0161654 A1    Jun. 30, 2011

(51) Int. Cl.
*G06F 15/173* (2006.01)
*G06F 15/16* (2006.01)

(52) U.S. Cl. ..... 709/238; 709/227; 709/243; 379/266.1; 379/204.01

(58) Field of Classification Search ................ 709/227, 709/238, 243, 204.1, 266.1
See application file for complete search history.

(56) References Cited

U.S. PATENT DOCUMENTS

| | | | |
|---|---|---|---|
| 6,427,132 B1 * | 7/2002 | Bowman-Amuah | 703/22 |
| 6,611,867 B1 * | 8/2003 | Bowman-Amuah | 709/224 |
| 6,934,756 B2 * | 8/2005 | Maes | 709/227 |
| 7,245,291 B2 * | 7/2007 | Sharif et al. | 345/172 |
| 7,539,127 B1 * | 5/2009 | Shaffer et al. | 370/216 |
| 2002/0184311 A1 * | 12/2002 | Traversat et al. | 709/204 |
| 2002/0184373 A1 * | 12/2002 | Maes | 709/228 |
| 2003/0163697 A1 * | 8/2003 | Pabla et al. | 713/171 |
| 2005/0074109 A1 * | 4/2005 | Hanson et al. | 379/207.04 |
| 2005/0074111 A1 * | 4/2005 | Hanson et al. | 379/212.01 |
| 2005/0108247 A1 | 5/2005 | Heinla et al. | |
| 2005/0122965 A1 * | 6/2005 | Heinla et al. | 370/357 |
| 2005/0198299 A1 * | 9/2005 | Beck et al. | 709/226 |
| 2006/0109976 A1 * | 5/2006 | Sundaram et al. | 379/265.02 |
| 2006/0187900 A1 * | 8/2006 | Akbar | 370/352 |
| 2007/0274293 A1 * | 11/2007 | Forbes | 370/352 |
| 2007/0291789 A1 | 12/2007 | Kutt et al. | |
| 2008/0159271 A1 * | 7/2008 | Kutt et al. | 370/352 |
| 2008/0225750 A1 | 9/2008 | Jefremov | |
| 2008/0253537 A1 * | 10/2008 | Johnston et al. | 379/88.08 |
| 2009/0013059 A1 | 1/2009 | Partaker et al. | |
| 2009/0122968 A1 | 5/2009 | Kutt | |
| 2009/0276224 A1 * | 11/2009 | Medina et al. | 704/275 |

OTHER PUBLICATIONS

Salaman A. Baset et al. "An analysis of the Skype Peer-to-Peer Internet Telephony Protocol" Dept. of Computer Science, Columbia University, New York Sep. 15, 2004.
User Manual for PrettyMay Call Center for Skype Version 4.0 Copyright © 2004-2009 PrettyMay Team Printed on Aug. 18, 2009.

\* cited by examiner

*Primary Examiner* — Ranodhi Serrao
(74) *Attorney, Agent, or Firm* — Pearl Cohen Zedek Latzer, LLP

(57) ABSTRACT

System and method for recording communication sessions in a peer-to-peer communication networks. End-devices of the peer to peer communication network may register with a selected super-node that may fork media to a recording system for recording. Communication sessions arriving at a call center may be transferred between the external end-device and the target agent end-device via a recorder and the communication session media may be recorded. Alternatively, a conference call may be established between an external end-device, a target agent end-device of a call center and a recorder over a peer-to-peer communication network. After the conference call is established, the recorder may receive media transferred between the external end-device and the target agent end-device and record that media.

26 Claims, 5 Drawing Sheets

PEER-TO-PEER TELEPHONY RECORDING

BACKGROUND OF THE INVENTION

Recording has become a key feature of modern interaction-related environments and/or systems. For example, systems used for operating call centers, banks, academic institutions, government agencies, health care facilities and/or web based shopping may all comprise some form of recording capacities and/or systems. Interactions involving customers, clients, constituents or any other users associated with various respective industries, organizations and companies may all be recorded or may be selectively recorded according to various criteria. Recording of calls or communication sessions may be mandatory for some organizations, used as voice receipt or used for tracking, logging or other purposes.

Recording of calls may be performed at the end-devices. For example, in a peer-to-peer network, a computer application may record communication sessions using a recording agent for capturing communication sessions signaling and communication sessions media. However, such solutions may not be available or feasible for various scenarios as they may require installation of additional hardware or software on each endpoint that needs to be recorded. Additionally, recording at the endpoints may be highly distributed, which may cause central management of recording to be difficult or cumbersome. Recording at the endpoint may not be applicable for compliance requirements. For example, recording at the endpoint may not comply with the law or may be objected due to privacy issues.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
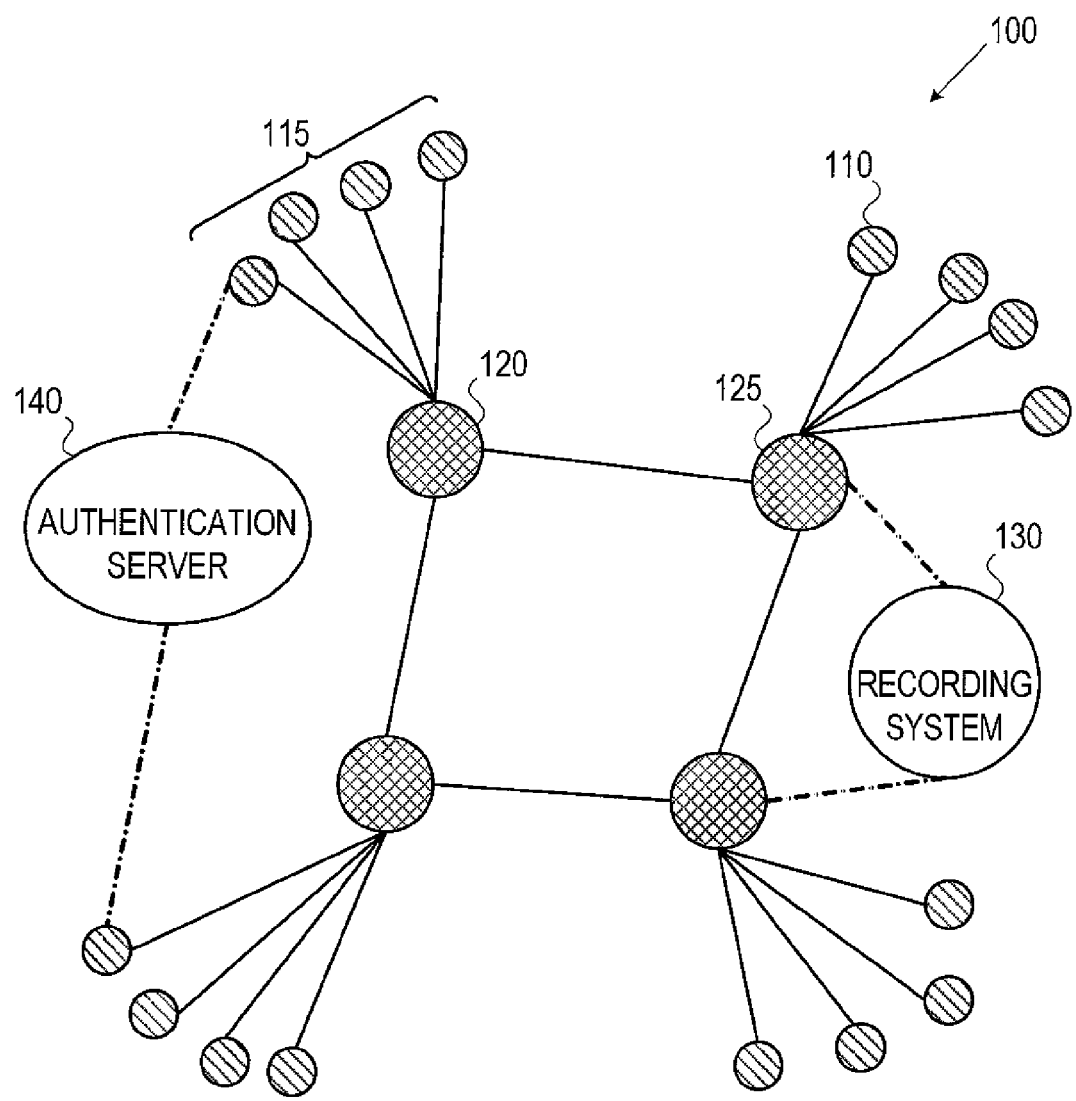
FIG. 1 is a high-level diagram of an exemplary peer-to-peer communication network according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Reference is made to FIG. 1 depicting a high-level diagram of an exemplary peer-to-peer communication network 100 according to embodiments of the invention. According to embodiments of the invention, system 100 may comprise a plurality of end-devices 110 and super-nodes 120, an authentication server 140 and a recording system 130.

Peer-to-peer communication network 100 may be any distributed network architecture composed of participants such as end-devices 110 and super-nodes 120 that make a portion of their resources such as processing power, disk storage or network bandwidth directly available to other network participants, without the need for central coordination instances such as servers or stable hosts. Network 100 may be, for example, a packet based peer-to-peer communication network. Peer-to-peer communication network 100 may utilize Voice over Internet Protocol (VoIP) technology to establish telephone sessions or calls between end-devices 110. Peer-to-peer communication network 100 may comprise infrastructure nodes such as super-nodes 120 to perform infrastructure related tasks. Typically, end-devices 110 may be connected to a super-node 120 and each such end-device 110 may register itself with authentication server 140. For example, super-nodes 120 may function as proxy servers and subgroups of end-devices 115 may connect to a single super-node 120 in a star-like fashion. End devices 110 may communicate by passing media and signaling related to a communication sessions through super-nodes 120.

End-device 110 may be any device that can originate or receive a communication session in the peer-to peer communication network 100. For example, end-devices may be dedicated VoIP phones which are phones that allow VoIP calls without the use of a computer, VoIP-capable computers, routers, and gateways within the peer-to-peer communication network 100 or plain old telephone service (POTS) dial peers such as phone sets, cell phones, and fax machines, connected to peer-to-peer communication network 100 through an adaptor such as an Analog Telephone Adapter (ATA). Additionally, end-device 110 may be coupled to an automatic call distributor (ACD) of a call center and/or to an interactive voice response (IVR) sub-system.

An IVR sub-system may perform an initial interaction with incoming communication sessions. For example, an IVR sub-system may gather information pertaining to an incoming communication session. Such information may be, for example, a caller identification (CID). An IVR sub-system may further provide a voice-menu in order to prompt a caller to provide further information pertaining to the communication session and/or the caller. An ACD sub-system may select one of agents 140 to handle an incoming communication session and may further forward a communication session to the selected agent.

It will be noted that although a communication session enabling two or more humans or other entities (e.g., a human caller and an IVR application) to communicate will typically be referred to hereinafter as a communication session, the term "communication session" should be expansively and broadly construed to include any applicable session or interaction. A communication session may be a telephony session, an instant massaging session, a video session, a chat session, a web co-browsing session or any other applicable type of multi-media interaction. Web co-browsing session, also referred to as collaborative browsing may refer to several people accessing the same web pages at the same time. For example, web co-browsing may be used by call center agents to assist clients navigate the company web site. A communication session may be, for example, a telephone call carried over a packet based network, such as voice or voice, video and other data over Internet Protocol (VoIP) session. A communication session data may be divided to the communication session signaling which is the traffic used to establish the connection, and to the media which is voice, video or any other type of information that is transferred between end-devices 110 in the communication session.

Accordingly, recording a communication session media may comprise recording any applicable information, e.g., audio, video, text etc it will further be noted that a caller or end user may be any applicable entity, e.g., a user, a customer or client, or an organization such as academic institution, a government agency, a service provider or a call center providing services to, or acting as a front end for a business, a company, an institution or any other applicable organization.

According to embodiments of the invention, system 100 may additionally comprise recording super-nodes 125. Recording super-nodes 125 may have super-nodes capabilities and, in addition, function as dedicated recording servers. Once a communication session is established, recording super-nodes 125 may fork media associated with the communication session to recording system 130, which may record the communication session. The term "fork" may be used throughout the specification to describe the process of creating duplicate of media of a communication session to be sent to a destination other than the destination of the respective communication session. For example, recording super-nodes 125 may transfer media between the communication session endpoints 110, create duplicate of this media and send the duplicate to recording system 130.

According to embodiments of the invention, recording super-node 125 may be assigned to end-devices 110 that need to be recorded, and end-devices 110 that need to be recorded may register with recording super-node 125. For example, end-devices 110 that need to be recorded may receive an instruction to register with a recording super-node 125 from authentication server 140 on end-device 110 login. Additionally, end-devices 110 that need to be recorded may receive a list of recording super-nodes 125 to register with from authentication server 140 on end-device 110 login.

According to embodiments of the invention, associating end-devices 110 to a recording super-node 125 may be based on static entries in authentication server 140 recording database. Upon an end-device 110 login, authentication server 140 may retrieve the address of recording super-node 125 from the recording database, in case end-device 110 needs to be recorded, and return the address of recording super-node 125 to end-device 110

Alternatively, authentication server 140 may be in communication with recording system 130. Upon an end-device 110 login, authentication server 140 may provide the identity of end-device 110 to recording system 130 together with a query whether end-device 110 should be recorded. Recording system 130 may decide whether end-device 110 should be recorded. If end-device 110 should be recorded, recording system 130 may choose the recording super-node 125 and may provide the address of the chosen recording super-node 125 to authentication server 140, which may provide that address to end-device 110. End-device 110 may then send a request to register with the selected recording super-node 125. Alternatively, other suitable protocols may be used to assign end-devices 110 to recording super-nodes 125. Authentication server 140 may communicate with recording system 130 utilizing Web Services (WS) standard for inter-system communication. Alternatively, other suitable communication protocols may be used.

According to embodiments of the invention, multiple recording super-nodes 125 may be deployed in a network together with load balancing application that may distribute communication traffic among recording super-nodes 125. Redundancy may be implemented by coupling two recording super-nodes 125 in an active/standby mode.

According to embodiments of the invention, any super-node 120 may be used as a recording super-node. Super-nodes 120 may have the address of recording system 130. For example, super-nodes 120 may learn the address of recording system 130 from authentication server 140. The address of recording system 130 may be either statically configured in authentication server 140 database, or can be learned by authentication server 140 from an external source such as a load balancing service, another server, some global public directory, the Active Directory by Microsoft, etc. End-devices 110 may register with any one of super-nodes 120. Super-node 120 may establish an auxiliary session with recording system 130 for reporting communication session or call events. For example, super-node 120 may communicate with recording system 130 using NICE® Distributed Interaction Metadata Messages (IMM) protocol over Session Initiation Protocol (SIP) transport, as described in US patent application publication No 2007\0019634 which is hereby incorporated by reference in its entirety. Alternatively, other communication protocols suitable for metadata delivery such as Hypertext Transfer Protocol (HTTP) or WS may be used.

After a communication session is established with end-device 110 through super-node 120, super-node 120 reports the communication session event to recording system 130 over the auxiliary session. Recording system 130 may determine whether the communication session should be recorded. If the communication session should be recorded, recording system 130 may issue a recording request to super-node 120. For example, recording system 130 may establish SIP session with super-node 120 instructing it to fork communication session media associated with the communication session to recording system 130. Super-node 120 may then start forking the communication session traffic to recording system 130. When the communication session ends, super-node 120 may report a communication session end event to recording system 130 and recording system 130 may than terminate the recording. According to embodiments of the invention, the SIP session between recording system 130 and super-node 120 may comply with the SIP session for recording purposes as described in US publication No. 2007-0019634 which is herby incorporated by reference in its entirety.

According to embodiments of the invention, when any super-node 120 is used as a recording super-node, redundancy and load balancing may be implemented by the peer-to-peer communication network 100 itself. Load balancing may be implemented by distributing endpoints 110 between network super-nodes 120, as in typical peer-to-peer networks. Redundancy may also be inherent to the peer-to-peer network. In case of super-node 120 failure, end-devices 110 that were connected to the defected super-node 120, may be assigned to a different super-node 120 which may connect with recording system 130 as explained above to continue the recording.

Typically, the media that is forked by super-node 120 to recording System 130 may be not encrypted. However standard encryption mechanisms like Transport Layer Security (ILS) for call meta-data and signaling and Secure Real-time Transport Protocol (SRIP) or Datagram Transport Layer Security for Secure Real-time Transport Protocol (DTLS-SRIP) for encrypted media may be utilized by the network. If TLS and SRTP or DILS-SRIP security method is utilized, a Public Key Infrastructure (PKI) may exist. The PKI may be responsible for issuing digital certificates for both super-node 120 and recording system 130. Alternatively, super-node 120 may already have digital certificate, issued by authentication server 130 during registration. The same authentication server may, for example, issue digital certificate for recording system 130 as well. Typically, end-devices 110 are issued a digital certificate by authentication server 130 on end-device 110 login.

Figure 2:
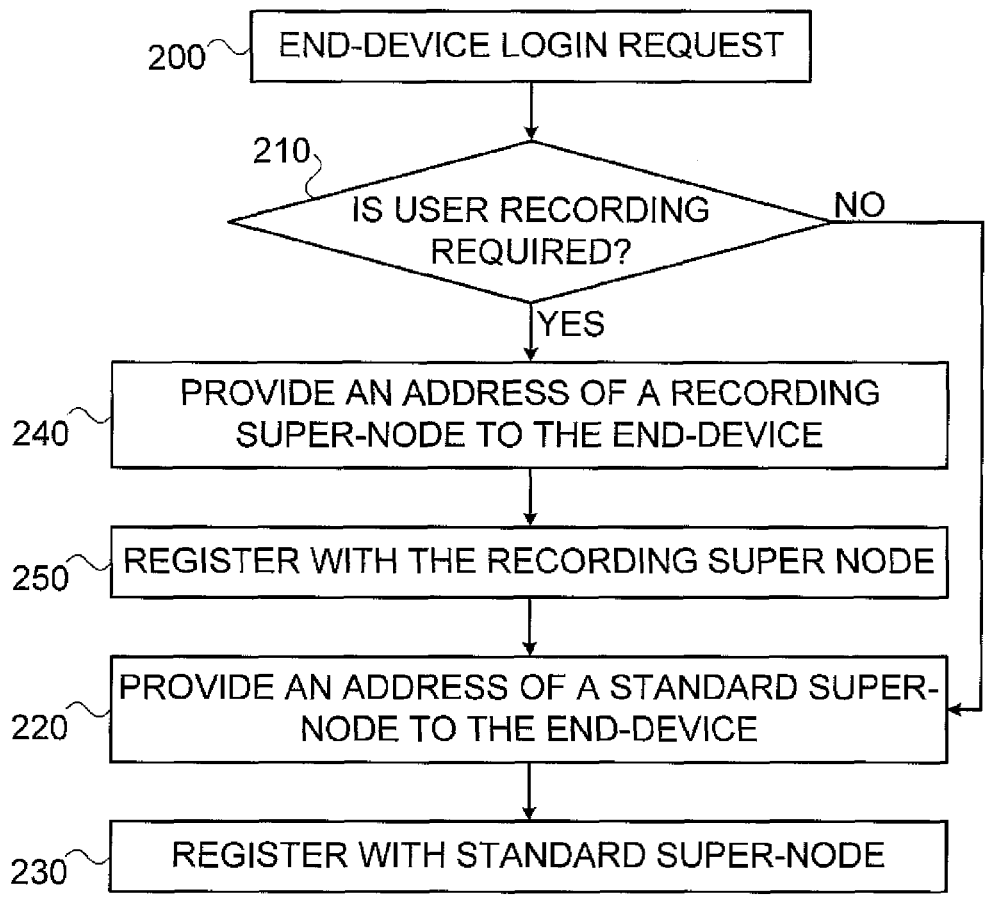
FIG. 2 is a flowchart illustration of a method for registering an end-device with a recording super-node upon login to a peer-to-peer communication network according to embodiments of the invention.

Reference is now made to FIG. 2 which is a flowchart illustration of a method for registering an end-device with a recording super-node upon login to a peer-to-peer communication network according to embodiments of the invention. According to embodiments of the invention, when a login request arrives from an end-device (block 200) to a peer-to-peer communication network it is decided whether the end-device should be recorded (block 210). For example, when a login request from an end-device arrives at an authentication server of a peer-to-peer communication network, the authentication server may decide that the end-device need to be recorded based on static entries in the authentication server recording database. Alternatively, the authentication server may be in communication with a recording system and may provide the identity of the end-device to the recording system together with a query whether the end-device should be recorded. The recording system may decide whether the end-device should be recorded. If the end-device should be recorded, the recording system may choose a recording super-node and may provide the address of the chosen recording super-node to the authentication server. If the end-device should be recorded, an address of a recording super-node may be provided to the end-device (block 240). The end-device may then register with the recording super-node (block 250). If the end-point should not be recorded, address of a standard, i.e. not-recording super-node may be provided to the end-device (block 220). The end-device may then register with the standard super-node (block 230).

Figure 3:
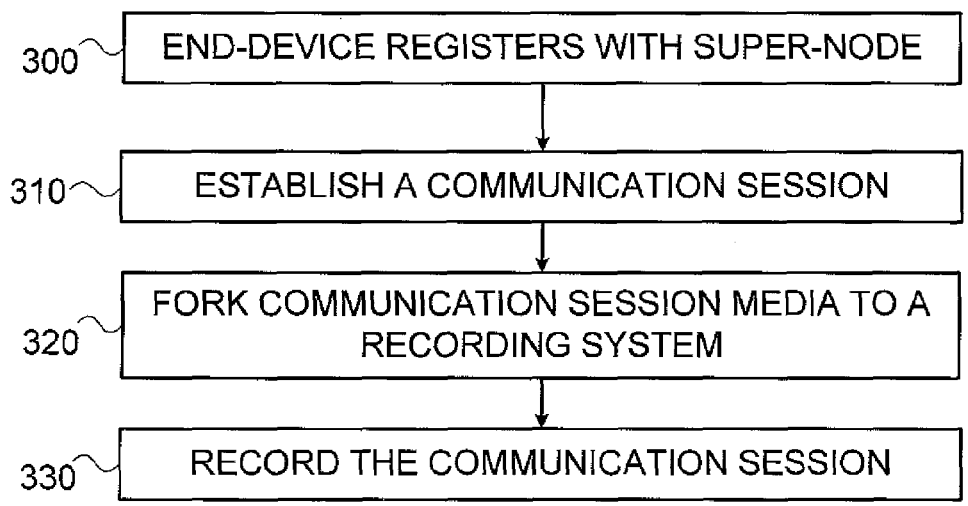
FIG. 3 is a flowchart illustration of a method for recording peer-to-peer communication sessions according to embodiments of the invention.

Reference is now made to FIG. 3 which is a flowchart illustration of a method for recording peer-to-peer communication sessions according to embodiments of the invention. As seen in block 300 end-devices of the peer-to-peer communication network may register with a selected super-node. The selected super-node may be a dedicated recording super-node, such as, but not limited to, recording super-node 125. For example, end-devices may send a request to an authentication server to register to the peer-to-peer network. The authentication server may receive the registration request from the end-device. End-devices that need to be recorded may receive an instruction to register to a selected super-node and a list of selected super-nodes to register with from the authentication server on end-device login. Alternatively, any selected super-node may be capable of forking media to the recording system. For example, the selected super-node may learn the address of the recording system from the authentication server. After a communication session is established between two or more endpoints (block 310), the media associated with the communication session may be forked to the recording system (block 320), which may record the communication session (block 330).

Figure 4:
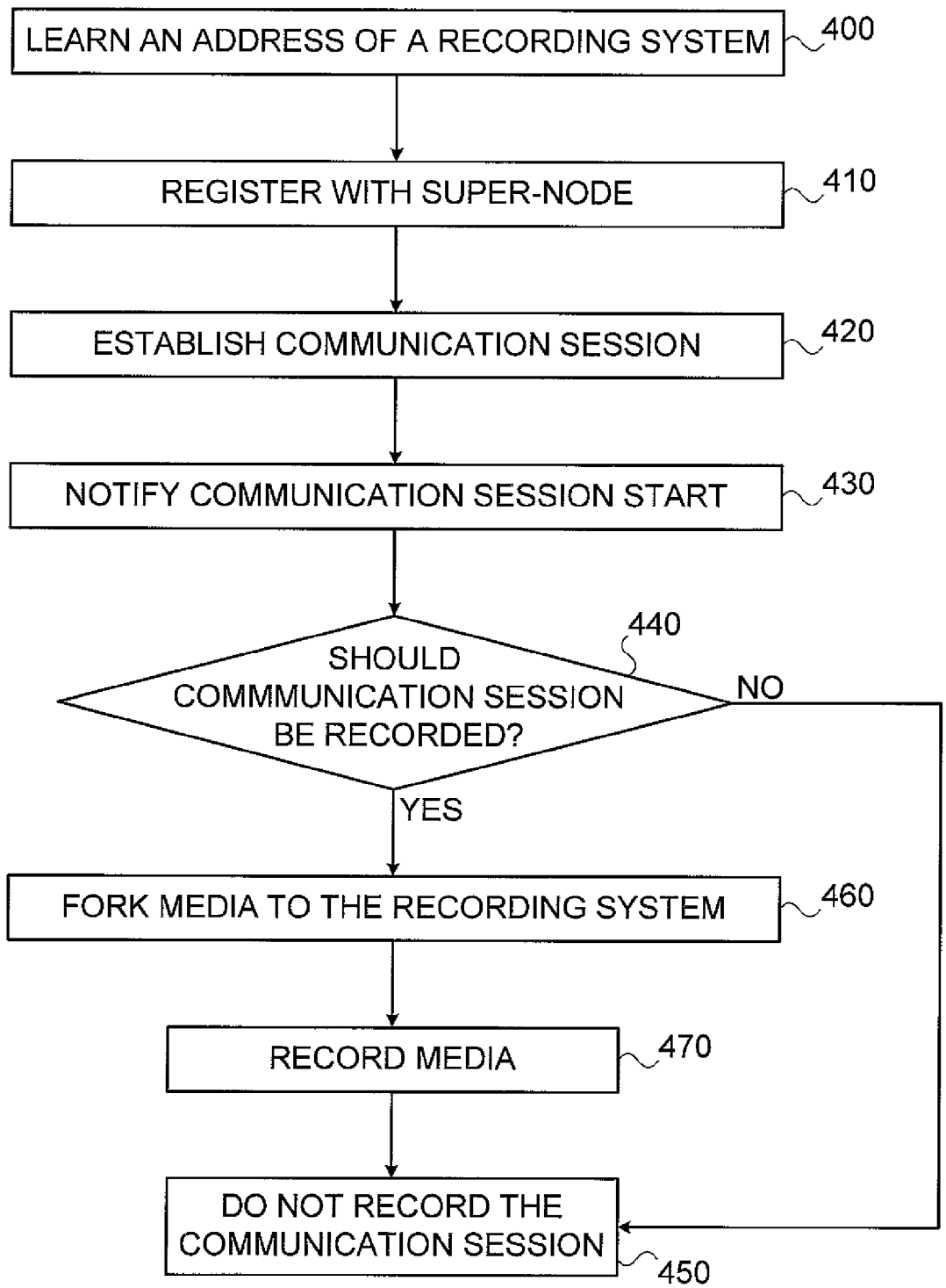
FIG. 4 is a flowchart illustration of a method for using any super-node for recording in a peer-to-peer communication network according to embodiments of the invention.

Reference is now made to FIG. 4 which is a flowchart illustration of a method for using any super-node for recording in a peer-to-peer communication network according to embodiments of the invention. According to embodiments of the invention, super-nodes of a peer-to-peer communication network may get an address of a recording system (block 400). For example, the super-nodes may learn the address of the recording system from an authentication server. End-devices may register with any one of the super-nodes of the peer-to-peer communication network (block 410). Once a communication session is established in the peer-to-peer communication network via a super-node (block 420), a notification of the beginning of the session may be issued (block 430) and it may be decided whether the communication session should be recorded (block 440). For example, a communication session start event may be reported to the recording system. The recording system may determine whether the communication session should be recorded. If the communication session should be recorded, the recording system may issue a recording request. Alternatively, decision whether the communication session should be recorded may be accepted at the super-node. If it is decided that the communication session should not be recorded, the communication session may not be recorded (block 450). If the communication session should be recorded, the media of the communication session may be forked (block 460), and the communication session may be recorded (470).

Figure 5:
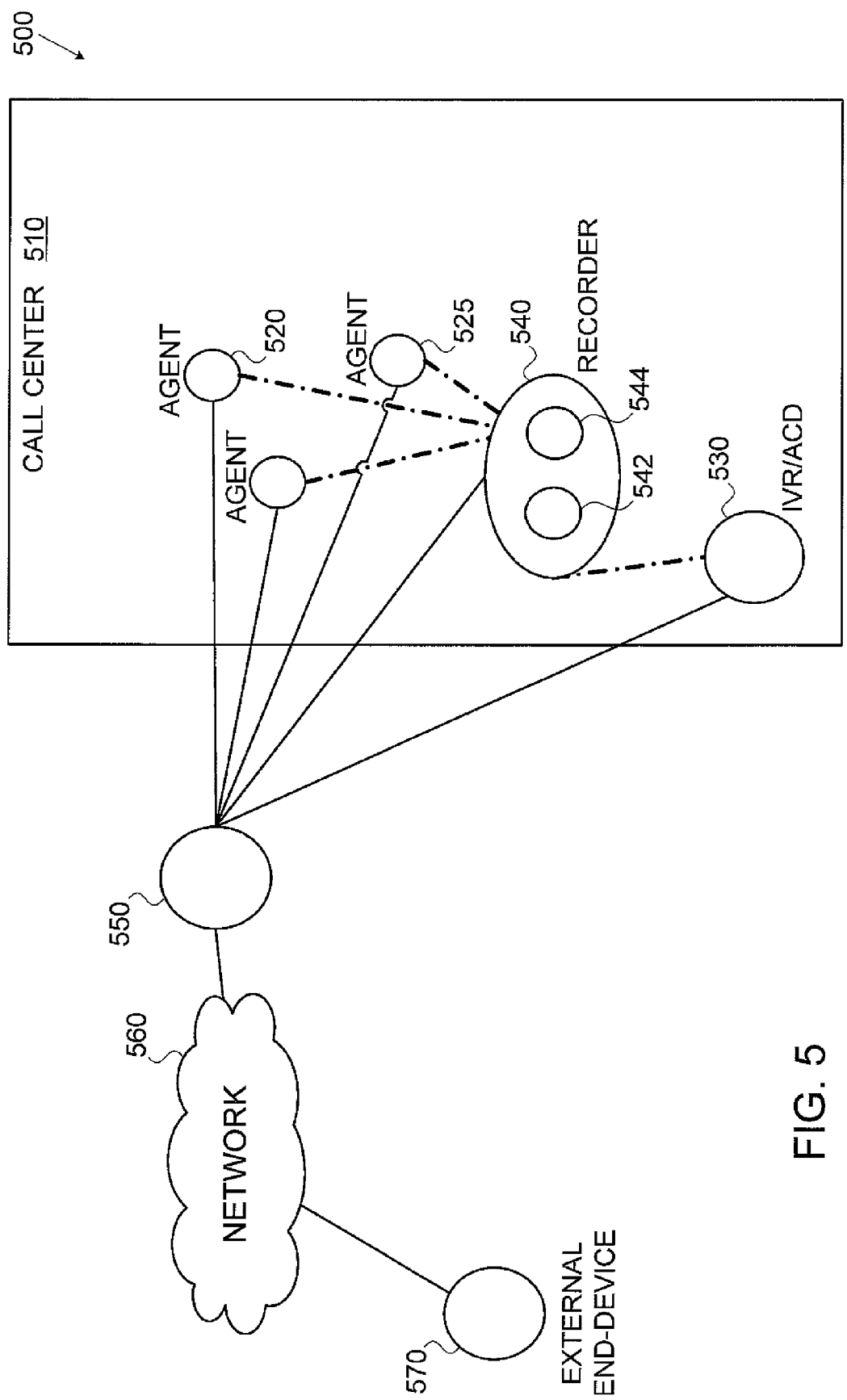
FIG. 5 is a high-level diagram of an exemplary peer-to-peer communication network according to embodiments of the invention.

Reference is made to FIG. 5 depicting a high-level diagram of an exemplary peer-to-peer communication network 500 according to embodiments of the invention. According to embodiments of the invention, network 500 may comprise a plurality of external end-devices 570, at least one super-node 550 and a call center 510 comprising a plurality of agent end-devices 520, an IVR/ACD 530 and a recorder 540. According to embodiments of the invention, network 500 may be coupled through super-node 550 to a communication network 560. Communication network 560 may comprise a peer-to-peer communication network, such as network 100. Additionally, communication network 560 may be coupled to a public switched telephone network PSTN network. It should be noted that while in the embodiments of the invention shown in FIG. 5 IVR/ACD 530 system are depicted as a single integrated system, IVR/ACD 530 system may be separated into two separate systems, IVR and ACD. Alternatively, call center 510 may not comprise IVR system. Additionally, while in the embodiments of the invention depicted in FIG. 5 agent end-devices 520, IVR 525 and ACD 530 are depicted coupled to a single super-node 550, according to embodiments of the invention, agent end-devices 520, and IVR/ACD 530 may be registered to different super-nodes as well.

According to embodiments of the invention, recorder 540 may be placed after the IVR/ACD 530, if only the media transferred between agent end-devices 520 and external end-device 570 needs to be recorded as depict in FIG. 5, or before IVR/ACD 530, if recording the IVR session is required as well (not shown).

According to embodiments of the invention, recorder 540 may comprise two nodes, external node 542 and internal node 544. Each of external node 542 and internal node 544 may have a different and unique identity or address and both may be connected to communication network 500.

According to embodiments of the invention, after a communication session from an external end-device 570 arrives at call center 510, it is first directed to IVR/ACD system 530. IVR/ACD system 530 may collect caller information and choose a target agent end-device 525. IVR/ACD system 530 may than call external node 542 of recorder 540 and send a call request to recorder 540 to call target agent end-device 525 and establish a communication session between recorder 540 and agent end-device 525. For example, sending such a call request can be done by external application programming interface (API) between recorder 540 and IVR/ACD system 530, or by using peer-to-peer communication such as instant message. The request may comprise the number or address of target agent end-device 525, the number or address of external end-device 570 and any other information gathered by IVR/ACD system 530, as may be required.

Upon receiving the call request, recorder 540 may initiate an outgoing communication session on internal node 544 to target agent end-device 525. After the outgoing communication session between internal node 544 and target agent end-device 525 is established, IVR/ACD system 530 may transfer the communication session from an external end-device 570 to external node 542 of recorder 540 and drop from the communication session.

Outgoing communication sessions may pass through the recorder in a similar manner. For example, target agent end-device 525 may initiate a session by calling internal node 544 of recorder 540 and send a call request to recorder 540 to call external end-device 570 and establish a communication session between recorder 540 and external end-device 570. For example, sending such a call request can be done by external application programming interface (API) between recorder 540 target agent end-device 525, or by using peer-to-peer communication such as instant massage. The request may comprise the number or address of target agent end-device 525, the number or address of external end-device 570 and any other information, as may be required. Upon receiving the call request, recorder 540 may initiate an outgoing communication session on external node 542 to external end-device 570.

During the communication session, recorder 540 may act as a proxy, receiving external end-device 570 media on external node 542 and sending it to target agent end-device 525 on internal node 544, and receiving agent end-device 525 media on internal node 544 and transferring it to external end-device 570 on external node 542. Recorder 540 also saves and records copy of the media.

Once the communication session is terminated at one node, recorder 540 may terminate the communication session on the other end stop the recording. For example if external end-device 570 terminates the communication session, recorder 540 may terminate the communication session on internal node 544 and if agent end-device 525 terminates the communication session, recorder 540 may terminate the communication session on external node 542.

According to embodiments of the invention, recorder 540 may have a single node which may perform the functionality of external node 542 and internal node 544.

According to embodiments of the invention, recording communication sessions at peer-to-peer communication network 500 may be achieved by implementing the communication session as a conference call such that target agent end-device 525, external end-device 570 and recorder 540 are participants in the conference call. While connected to the conference call, recorder 540 may receive media transferred between target agent end-device 525 and external end-device 570 and record that media.

For example, after a call from an external end-device 570 arrives at call center 510, and after IVR/ACD system 530 had chosen a target agent end-device 525, IVR/ACD system 530 may create a communication session with target agent end-device 525 and recorder 540, transfer them into a conference call and drop from the communication session. Alternatively, IVR/ACD system 530 may create a communication session with target agent end-device 525 and drop from the communication session. Agent end-device 525 may then create a conference call and add recorder 540 to the conference call. Similarly, outgoing communication sessions initiated by agent end-device 520 may be implemented as a conference call, such that agent end-device 520, external end-device 570 and recorder 540 are participants in the conference call. For example, agent end-device 520 may create a conference call and add recorder 540 and external end-device 570 to the conference call.

Figure 6:
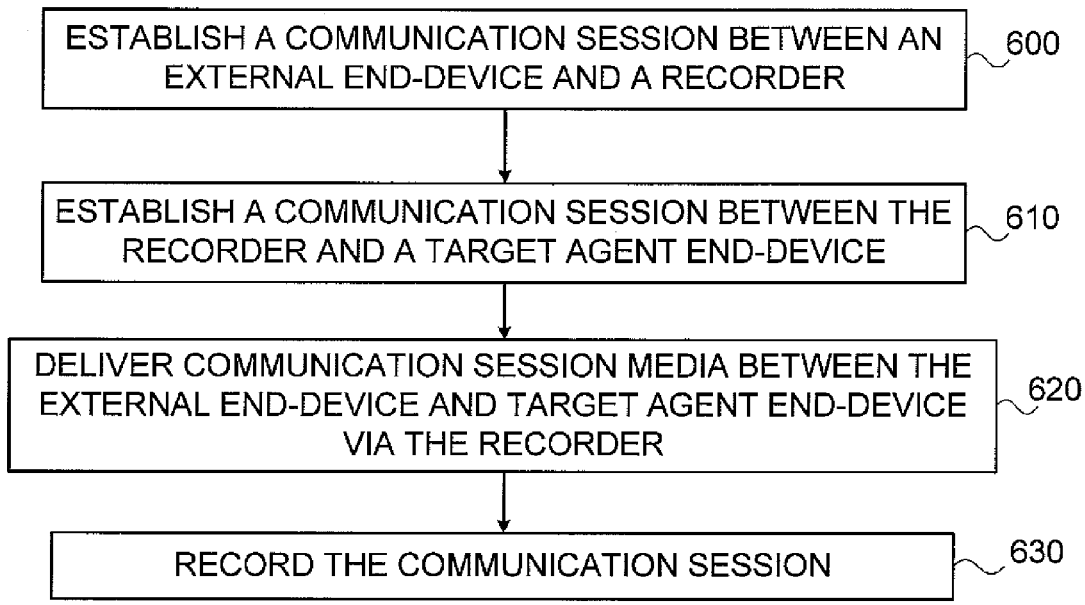
FIG. 6 is a flowchart illustration of a method for recording communication sessions between an external end-device and an agent end-device over a peer-to-peer communication network according to embodiments of the invention.

Reference is now made to FIG. 6 which is a flowchart illustration of a method for recording communication sessions between an external end-device and an agent end-device over a peer-to-peer communication network according to embodiments of the invention. Although embodiments of the invention are not limited in this respect, the method may be performed by embodiments of the invention, for example, an embodiment as shown in FIG. 5.

According to embodiments of the invention, a communication session is established between an external end-device and a recorder (block 600). The communication session may be established over a selected super-node of the peer-to-peer network. As seen in block 610 another communication session is then established between the recorder and a target end-device. The recorder may pertain to a call center. For example, when the external end-device initiates a communication session, the external end-device may be connected to an IVR/ACD system that may collect caller information and choose a target agent end-device from a plurality of agent end-devices coupled to the IVR/ACD. The IVR/ACD system may than call the recorder and send a call request to the recorder to establish a communication session between the recorder and the target agent end-device. For example, sending such a call request can be done by external application programming interface (API) between the recorder and the IVR/ACD system, or by using peer-to-peer communication such as instant massage. The request may comprise the number or address of the target agent end-device, the number or address of the external end-device and any other information as may be required. The recorder may then initiate a communication session to the target agent end-device and the external end-device may be transferred to the recording system from the IVR/ACD system. Alternatively, in case of outgoing communication session a session is first established between the target agent end-device and the recorder and than a session is established between the recorder and the external end-device via a selected super-node over the peer-to-peer network.

After these sessions are established, communication session media may be transferred between the external end-device and target agent end-device via the recorder (block 620) and the communication session media may be recorded (block 630).

Figure 7:
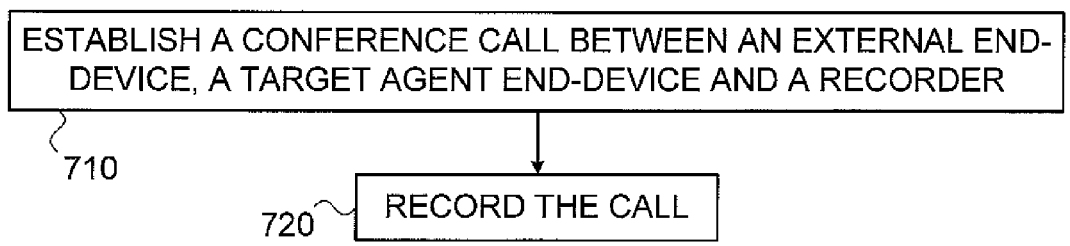
FIG. 7 is a flowchart illustration of a method for recording communication sessions implemented as conference call between an external end-device, an agent end-device and a recorder over a peer-to-peer communication network according to embodiments of the invention.

Reference is now made to FIG. 7 which is a flowchart illustration of a method for recording communication sessions implemented as conference call between an external end-device, an agent end-device and a recorder over a peer-to-peer communication network according to embodiments of the invention. Although embodiments of the invention are not limited in this respect, the method may be performed by embodiments of the invention, for example, an embodiment as shown in FIG. 5.

According to embodiments of the invention, a conference call may be established between an external end-device, a target agent end-device and a recorder (block 710) over a peer-to-peer communication network. For example, if an IVR/ACD system of a call center receives a communication session from an external end-device, the IVR/ACD system may create a communication session with the target agent end-device and the recorder, transfer them into a conference call and drop from the communication session. Alternatively, the IVR/ACD system may create a communication session with the target agent end-device and drop from the communication session and the agent end-device may then create a conference call and add the recorder to the conference call. Similarly, for outgoing communication sessions the agent end-device may create a conference call and add recorder and the external end-device to the conference call. After a conference call is established, the recorder may receive media transferred between the external end-device and the target agent end-device and record that media (block 720).

It will be recognized that according to embodiments of the invention, the actual recording of a communication session may be performed in any applicable way as known in the art. For example, any suitable recording server, platform or system, e.g., NICE Perform® from NICE Ltd. of Ra'anana, Israel may be used to record a communication session once a decision to record the communication session has been made. Embodiments of the invention are not limited by the type, nature or other aspects of the recording system used for recording communication sessions as described herein.

Some embodiments of the present invention may be implemented in software for execution by a processor-based system, for example, recording super-nodes 125. For example, embodiments of the invention may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for recording peer-to-peer communication sessions, the method comprising:
   establishing a communication session between a first end-device and a second end-device over a peer-to-peer communication network via a selected super-node server; and
   forking, by the selected super-node server, media associated with the communication session to a recording system,
   wherein establishing the communication session comprises:
   receiving by an authentication server a request from the second end-device to register with the peer-to-peer network;
   providing, by the authentication server to the recording system, identification details of the second end-device and querying whether a communication session involving the second end-device should be recorded;
   choosing by the recording system the selected super-node server and providing identification details of the selected super-node server to the authentication server;
   sending the identification details of the selected super-node server to the second end-device; and
   sending a request by the second end-device to register to the selected super-node server.

2. The method of claim 1, wherein the communication session is one of a telephony session, an instant massaging session, a video session, a chat session, a web co-browsing session or voice over Internet Protocol (VoIP) session.

3. The method of claim 1, wherein the second end-device is coupled to an automatic call distributor (ACD) of a call center.

4. The method of claim 1, further comprising:
   distributing communication traffic among selected super-nodes by a load balancing application.

5. The method of claim 1, further comprising:
   coupling two selected super-nodes in an active/standby mode.

6. The method of claim 1 further comprising:
   receiving by the selected super-node server an address of the recording system from the authentication server;
   establishing by the selected super-node an auxiliary session with the recording system for reporting communication session events;

determining by the recording system that the communication session is to be recorded; and instructing the selected super-node server to fork the media associated with the communication session to the recording system.

7. The method of claim 1 further comprising:

issuing digital certificates to the selected super-node server and the recording system by a Public Key Infrastructure (PKI); and encrypting media and signaling related to the communication session.

8. The method of claim 1 further comprising:

issuing digital certificates to the selected super-node server and the recording system by the authentication server; and encrypting media and signaling related to the communication session.

9. A method for recording peer-to-peer communication sessions, the method comprising:

contacting an external end-device to an interactive voice response (IVR);

establishing a first communication session between the external end-device and a recording system over a peer-to-peer communication network via a selected super-node server;

sending to the recording system, by an external application programming interface (API) between the recording system and the IVR, a call request and identification details of a target agent end-device chosen from a plurality of agent end-devices coupled to the IVR, establishing a second communication session between a target agent end-device and the recording system, wherein the second communication session is initiated by the recording system;

transferring the external end-device to the recording system from the IVR; and delivering media between the external end-device and the target agent end-device via the recording system, wherein the recording system is to fork the media associated with the first and second communication sessions and to save duplicates of the media.

10. The method of claim 9, wherein the communication sessions comprise: an telephony session, an instant massaging session, a video session, a chat session, a web co-browsing session and voice over Internet Protocol (VoIP) session.

11. The method of claim 9, wherein the recording system comprises an internal node of the peer-to-peer network to communicate with the target agent end-device and an external node of the peer-to-peer network to communicate with the external end-device.

12. The method of claim 9, wherein sending the call request and the identification details of the target agent end-device is done by sending peer-to-peer instant messages.

13. The method of claim 9 wherein an automatic call distributor (ACD) is coupled to the IVR.

14. A system for recording a communication session in a peer-to-peer communication network, the system comprising:

a first end-device;

a selected super-node server;

a second end-device to establish the communication session between the first end-device and the second end-device over the peer-to-peer communication network via the selected super-node server;

a recording system; and an authentication server, wherein the authentication server is to receive a request from the second end-device to register with the peer-to-peer network, send the second end-device an instruction to register with the selected super-node server and to provide to the recording system identification details of the second end-device, wherein the recording system is to choose the selected super-node server and to provide identification details of the selected super-node server to the authentication server, wherein the authentication server is to send the identification details of the selected super-node server to the second end-device and to send a request to the second end-device to register to the selected super-node server, and wherein the selected super-node server is to fork media associated with the communication session to the recording system and wherein the recording system is to record the media.

15. The system of claim 14, wherein the communication is one of a telephony session, an instant massaging session, a video session, a chat session, a web co-browsing session and voice over Internet Protocol (VoIP) session.

16. The system of claim 14, further comprising:

an automatic call distributor (ACD) of a call center;

wherein the second end-device is coupled to the ACD.

17. The system of claim 14, further comprising:

a second super-node server; and a load balancing application to distribute communication traffic among the selected super-node server and the second super-node server.

18. The system of claim 14, further comprising:

a second super-node server coupled to the selected super-node server in an active/standby mode.

19. The system of claim 14 wherein the authentication server is further to send the selected super-node server an address of the recording system, and wherein the selected super-node server is to establish an auxiliary session with the recording system for reporting communication session events, and wherein the recording system is to determine that the communication session is to be recorded and to instruct the selected super-node server to fork the media associated with the communication session to the recording system.

20. The system of claim 14 further comprising:

a Public Key Infrastructure (PKI) to issue digital certificates to the selected super-node server and the recording system.

21. The system of claim 14, wherein the authentication server is to issue digital certificates to the selected super-node server and the recording system.

22. A system for recording a communication session in a peer-to-peer communication network, the system comprising:

a recording system;

a super-node server;

an external end-device a plurality of agent end-devices; and an interactive voice response (IVR), wherein following connection between the external end-device and the IVR, the IVR is to send the recording system, by an external application programming interface (API) between the recording system and the IVR, a call request and identification details of a target agent end-device chosen from the plurality of agent end-devices coupled to the IVR and further the IVR is to establish a first communication session between the external end-device and the recording system over the peer-to-peer communication network via the super-node server, wherein the recording system is to establish a second communication session between the target agent end-device and the recording system, to deliver media between the external end-device and the target agent end-device via the recording system, to fork the media associated with the first and second communication sessions and to record the media.

23. The system of claim 22, wherein the communication sessions comprise a telephony session, an instant messaging session, a video session, a chat session, a web co-browsing session and voice over Internet Protocol (VoIP) session.

24. The system of claim 22, wherein the recording system comprises an internal node of the peer-to-peer network to communicate with the target agent end-device and an external node of the peer-to-peer network to communicate with the external end-device.

25. The system of claim 22 wherein the IVR is to send to the recording system a call request and identification details of the target agent end-device by sending peer-to-peer instant messages.

26. The system of claim 22, further comprising an automatic call distributor (ACD) coupled to the IVR.

* * * * *